April 6, 1965 J. SCHALKWIJK 3,177,294
DEVICE FOR USE IN TELEPHONE SETS
Filed June 26, 1961
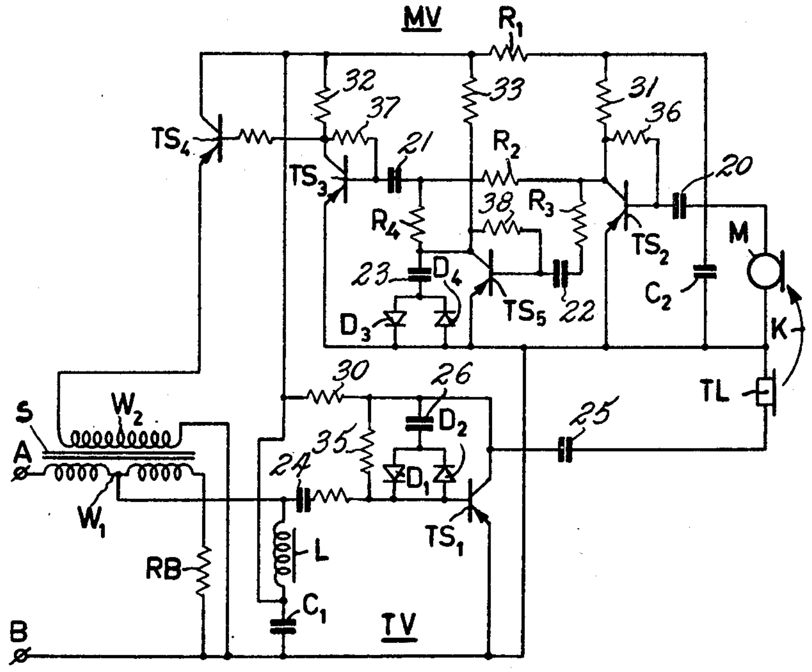
INVENTOR
JAN SCHALKWIJK
BY Frank R. Trifari
AGENT

United States Patent Office 3,177,294
Patented Apr. 6, 1965

3,177,294

DEVICE FOR USE IN TELEPHONE SETS

Jan Schalkwijk, Hilversum, Netherlands, assignor to North American Philips Company Inc., New York, N.Y., a corporation of Delaware Filed June 26, 1961, Ser. No. 119,460
Claims priority, application Netherlands, Aug. 1, 1960, 254,433
4 Claims. (Cl. 179—81)

The invention relates to an amplifying device for use in a telephone set having two amplifiers, in which the input of one amplifier and the output of the second amplifier are coupled with the terminals of the line connected to the set, whereas the output of the first amplifier is connected to the receiver and the input of the second amplifier is connected to the microphone. Such amplifying devices are known, e.g., from United States Patent No. 2,531,883.

With these amplifying devices self-oscillation may occur when the total amplification of the two amplifiers exceeds a given value. This is due to the fact that the two amplifiers are coupled with the same line and, moreover, that an acoustic coupling prevails between the microphone and the receiver.

It is common practice to connect the amplifiers to the line via a four-terminal circuit. If the four-terminal circuit is in the state of equilibrium for all frequencies, self-oscillation cannot occur. This requires a line balancing circuit, which matches the input impedance of the line for all frequencies concerned. This balancing circuit is costly and, moreover, the input impedance of the line may vary. These variations may be due to atmospheric influences on overhead lines and to the impedance differences of the lines, to which the line of the set may be connected. The invention has for its object to provide an amplifying device of which the stability is independent of the coupling between the amplifiers on the side of the line.

In accordance with the invention the second amplifier comprises a threshold circuit and the first amplifier a limiting circuit, the threshold level and the limit level respectively being chosen so that the maximum signal level of the signals produced by the receiver via the microphone in the microphone amplifier is lower than the threshold level.

This device has the advantage that the four-wire terminal circuit may be of very simple structure. This circuit then only serves to reduce the transmission of the microphone signals to the local receiver to an extent such that the sound reproduced by the receiver is not troublesome.

The invention will now be described more fully with reference to one embodiment shown in the drawing.

The drawing shows a receiver amplifier TV, a telephone receiver TL, a microphone amplifier MV, an electrodynamic microphone M and a balancing transformer S.

The amplifying stages comprising the transistors TS1, TS2, TS3 and TS5 are grounded emitter-connections, having direct-current load resistors 30, 31, 32 and 33, respectively, in their collector circuits, whilst the base current of these transistors is adjusted in known manner with resistors 35, 36, 37 and 38 connected between the respective collector electrode to the base electrode. The transistor TS4 is connected as an emitter-follower..

The primary winding W1 of the transformer S is connected via a resistor RB to the terminals A and B. These terminals constitute the connections of a telephone set with the line which links the set to the telephone exchange. The resistor RB is a balancing resistor which is approximately equal to the transformed input impedance of the line.

The line is fed in known manner with direct current from the telephone exchange. This current charges a capacitor C1 via a terminal A, part of the winding W1 and a choke L. From the junction between the choke L and the capacitor C1 the various amplifying stages are fed. The amplifying stages take a variable supply current during the transmission of speech signals. The capacity of the capacitor C1 is so high that the voltage at the supply point remains substantially constant.

The load resistor 31 of transistor TS2 is connected in known manner via a low pass filter comprising a resistor R1 and a capacitor C2 to the supply point, in order to avoid unwanted feedback effects.

The threshold circuit is formed by a transistor stage TS5 together with the resistors R2 and R4. The limiting circuit is formed by the transistor stage TS1.

The device operates furthermore as follows.

A signal from the microphone M is fed via blocking capacitor 20 to the base electrode of the transistor TS2. The amplified signal is fed via the resistor R2 and a blocking capacitor 21 to the base electrode of the transistor TS3. Moreover, the amplified microphone signal is fed via the resistor R3 and a blocking capacitor 22 to the base electrode of the transistor TS5. The collector electrode of this transistor is connected via a blocking capacitor 23 and two parallel-connected diodes D3 and D4 to the emitter electrode of transistor TS5. The diodes D3 and D4, connected in opposite senses, furnish at their terminals a radially symmetrical non-linear current-voltage characteristic (i.e., radial lines through the origin intersect the characteristics symmetrically with respect to the origin). Thus the amplitude of the alternating voltage at the collector electrode of the transistor is limited. The limiting level is determined by the threshold voltage of the two diodes. When the amplitude of the voltage at the collector electrode exceeds a value of about 0.5 v., one of the two diodes starts conveying such an amount of current that the voltage at the collector electrode remains limited substantially to the value of the threshold voltage.

The signal at the collector electrode of the transistor TS5 is fed via the resistor R4 and blocking capacitor 21 to the base electrode of the transistor TS3. This signal is in phase opposition to the signal fed via the resistor R2. The ratio between the resistors R4 and R2 is chosen so that the signal fed directly via the resistor R2 and the signal fed via the transistor TS5 and the resistor R4 are equal for those values of the signal amplitudes, which are not limited. Thus the two signals compensate each other, when the signal amplitude is lower than the limiting level. With a higher signal amplitude the voltages of the signal directly fed are fed to the base electrode of the transistor TS3 with the value by which they exceed the opposite voltage.

The transistor TS3 feeds the amplified signal via the emitter follower TS4 to the winding W2 of the transformer S, which transmits the signal via the winding W1 and the resistor RB to the terminals A and B.

The speech signals fed via the line to the terminals A and B are conducted via the tapping of the winding W1 to the choke L. The signal produced at the choke is fed via a blocking capacitor 24 to the base electrode of the transistor TS1. The amplified signal is fed via a blocking capacitor 25 to the receiver TL.

The collector electrode of the transistor TS1 is connected via a blocking capacitor 26 and the diodes D1 and D2 to the base electrode. The diodes D1 and D2 furnish at their terminals the same current-voltage characteristic as the diodes D3 and D4. When the voltage at the collector electrode exceeds in a positive sense the threshold voltage of the diode D1, a positive current is conducted via the diode to the base electrode, so that the current passing through the transistor decreases and the collector voltage drops. When the voltage at the collector electrode exceeds the threshold voltage of the diode D2 in a negative sense a negative current is conducted via the diode D2 to the base electrode, so that the current passing through the transistor increases and the voltage at the collector electrode rises. The feedback has the effect that the base current decreases in an absolute sense, so that a limiting of the signal fed to the receiver is obtained.

In the figure the acoustic coupling between the receiver TL and the microphone M is indicated by an arrow K. The sound from the receiver is conducted in the direction of the arrow K to the microphone M. Thus the microphone produces a signal, which is fed to the input of the microphone amplifier. Part of the amplified microphone signal, amplified by the amplifier MV is transmitted via the balanced transformers to the input of the receiver amplifier TV, which transmits the amplified signal to the receiver. A feedback circuit is thus completed. The limiting level of the receiver amplifier is chosen so that the maximum sound of the receiver produces signals in the microphone which, subsequent to amplification in the transistor stage TS2 lie below the threshold level of the threshold circuit. The circulating amplification can then no longer reach a value likely to produce self-oscillation. It appears therefrom that the coupling between the microphone circuit and the receiver circuit via the balanced transformer does not affect the stability.

In practice the threshold level of the threshold device is chosen so that the microphone amplifier does not amplify the noise of the ambient space. The distortion of the speech signals appears to be low with this choice of the threshold level.

What is claimed is:

1. A circuit for receiving signals from and applying signals to a common transmission path comprising a microphone, a receiver acoustically coupled to said microphone, a first amplifier having an input circuit connected to said path and an output circuit connected to said receiver, and a second amplifier having an output circuit connected to said path and an input circuit connected to said microphone, said second amplifier comprising a threshold circuit whereby amplification in said amplifier of signals received by said microphone below a first predetermined level independent of signal level is inhibited, said first amplifier comprising a limiting circuit to limit the maximum amplitude of signals transmitted by said receiver to a second predetermined level independent of signal level, said second predetermined level being sufficiently low that all signals received by said microphone from said receiver are lower than said first predetermined level.

2. A circuit for receiving signals from and applying signals to a common transmission path, comprising a microphone, a receiver acoustically coupled to said microphone, a receiver amplifier having an input connected to said transmission path and an output connected to said receiver, a transmitter amplifier having an input connected to said microphone and an output connected to said transmission path, and means for inhibiting self-oscillation in said circuit as a result of acoustic coupling between said receiver and microphone, said means comprising a threshold circuit connected in said second amplifier whereby amplification in said second amplifier of signals received by said microphone below a predetermined level independent of signal level is inhibited, and a limiting circuit connected to said first amplifier for limiting the acoustic signal transmitted by said receiver to a level independent of signal level, the limiting level of said limiting circuit being sufficiently low that the maximum amplitude of signals coupled from said receiver to said microphone is below said predetermined level.

3. The circuit of claim 2, in which said second amplifier comprises adding circuit means having first and second inputs, said threshold circuit comprises a transistor having emitter, base and collector electrodes, means connecting said transistor in grounded-emitter connection, means applying signals from said microphone to said first input and to said base electrode, means connecting said collector electrode to said second input, an element having a radially symmetrical non-linear current-voltage characteristic, and means connecting said element between said collector and emitter electrodes for providing negative feedback.

4. A circuit for receiving signals from and applying signals to a common transmission path, comprising a microphone, a receiver acoustically coupled to said microphone, a receiver amplifier having an input connected to said transmission path and an output connected to said receiver, said receiver amplifier comprising a transistor having base, emitter and collector electrodes, said transistor being connected as a grounded-emitter amplifier, a negative feedback circuit connected between said collector and base electrodes comprising an element having a radially symmetrical non-linear current-voltage characteristic, a transmitter amplifier having an input connected to said microphone and an output connected to said transmission path, said transmitter amplifier comprising a threshold circuit for inhibiting amplification in said second amplifier of signals received by said microphone that are below a predetermined level indepedent of signal level, said feedback circuit limiting the maximum amplitude of acoustic signals received by said microphone from said receiver to a level independent of the amplitude of signals reecived by said receiver amplifier and below said predetermined level.

References Cited in the file of this patent

UNITED STATES PATENTS

| | | |
|---|---|---|
| 2,223,200 | Augustadt | Nov. 26, 1940 |
| 2,332,430 | Berger | Oct. 19, 1943 |
| 2,545,477 | Levy | Mar. 20, 1951 |
| 2,743,314 | Jeanlin | Apr. 24, 1956 |
| 2,785,231 | Chase | Mar. 12, 1957 |
| 2,801,288 | Meacham | July 30, 1957 |
| 2,885,478 | Cerofolini | May 5, 1959 |
| 2,885,483 | Faulkner | May 5, 1959 |
| 2,964,598 | Parker | Dec. 13, 1960 |
| 3,046,354 | Clemency | July 24, 1962 |